United States Patent
Burnham

(10) Patent No.: US 6,564,746 B2
(45) Date of Patent: May 20, 2003

(54) SQUIRREL-POWERED GAME FEEDER

(76) Inventor: Harold Eugene Burnham, 2268 Hwy. 151, Farmerville, LA (US) 71241

( * ) Notice: Subject to any disclaimer, the term of this patent is extended or adjusted under 35 U.S.C. 154(b) by 0 days.

(21) Appl. No.: 09/947,039

(22) Filed: Sep. 4, 2001

(65) Prior Publication Data

US 2002/0026901 A1 Mar. 7, 2002

Related U.S. Application Data

(60) Provisional application No. 60/229,816, filed on Sep. 5, 2000.

(51) Int. Cl.$^7$ .................................................. A01K 5/00
(52) U.S. Cl. ..................... 119/57.91; 119/53.5; 119/55
(58) Field of Search ............................. 119/52.3, 52.4, 119/53.5, 54, 55, 57.9, 57.91

(56) References Cited

U.S. PATENT DOCUMENTS

| | | | | |
|---|---|---|---|---|
| 1,073,864 A | * | 9/1913 | Marcuse ...................... 119/55 |
| 3,780,701 A | * | 12/1973 | Wentworth, Sr. ........ 119/51.01 |
| 5,105,766 A | * | 4/1992 | Montgomery ............ 119/51.01 |
| 5,143,289 A | * | 9/1992 | Gresham et al. ......... 119/51.11 |
| 5,333,572 A | * | 8/1994 | Nutt .......................... 119/57.91 |
| 5,479,879 A | * | 1/1996 | Biek ........................... 119/52.2 |
| 5,572,949 A | * | 11/1996 | Bryant et al. ............. 119/57.91 |
| 5,613,464 A | * | 3/1997 | Petzel .......................... 119/55 |

* cited by examiner

Primary Examiner—Charles T. Jordan
Assistant Examiner—Kimberly S. Smith

(57) ABSTRACT

An animal feeder that is suspended alongside a tree trunk or other structure and utilizes the energy produced by live squirrels to dispense granular feed from a storage hopper to deer and other animals on the ground. The feeder assembly consists of a tubular feed container with a horizontal platform mounted on the bottom, a port hole for allowing feed particles to spill out onto the platform, and a simple agitating device that sweeps feed particles off the platform to the ground below. The agitating device is activated by the force generated by the weight and momentum of squirrels leaping back and forth from the tree trunk to the platform. The feeder works only during daytime hours when squirrels are active, and it cannot be accessed by any wildlife except squirrels and birds. If shelled corn is mainly used in the feeder, very little of it will be consumed by the squirrels themselves. They will eat only the small tip of a kernel, whereas the deer, hogs, turkeys, raccoons and other animals on the ground will readily eat all of it.

12 Claims, 3 Drawing Sheets

SQUIRREL-POWERED GAME FEEDER

BACKGROUND—CROSS-REFERENCE TO RELATED APPLICATIONS

This application claims the benefit of U.S. Provisional Application Ser. No. 60/229,816, filed on Sep. 5, 2000.

BACKGROUND—FIELD OF INVENTION

This invention relates to devices for dispensing granular feed, such as corn, to deer and other animals, more particularly, to devices that are powered by natural energy sources, rather than man-made sources such as batteries.

BACKGROUND—DESCRIPTION OF PRIOR ART

The need and desire to feed wildlife has always existed for people who love nature and have an interest in animals. Over the years, this demand has resulted in the invention of many different types of animal feeders, most of which provide a storage container for the food, coupled with a system for dispensing the food to animals over a period of time.

Although many people utilize wildlife feeders for the sole purpose of providing supplemental food to animals during stressful times, the primary use is to attract and hold wildlife, mainly deer, within a certain area for the purposes of hunting, photographing, or just observing. This, of course, must take place during the daytime hours when people can see, making feeders that provide food at night unsuitable to this purpose. Demand-type feeders, that is, those that allow the animals to feed at any time, are notorious for this disadvantage, because most grain-eating animals such as deer, prefer to visit the feeders under the protection of darkness. Another disadvantage of demand-type feeders is that most of them must be placed close to the ground, where undesirable animals cannot be easily excluded. For example, if a hunter desires to feed deer only, using a demand-type feeder can allow hogs and raccoons to raid and empty feeders if within reach. U.S. Pat. No. 5,233,941 to Ayliffe, Jun. 25, 1992, and U.S. Pat. No. 6,199,509 B1 to Mostyn, Aug. 10, 1999 are examples of demand-type feeders.

The most popular type of wildlife feeder available today seems to be those that are powered and controlled by mechanical devices, such as motors, timers or electronic components. These feeders have several main disadvantages, one being the fact that they are usually very expensive. Another disadvantage is the requirement for ongoing maintenance such as battery replacement or mechanical repairs. Also, some of these feeders are noisy and invasive to natural surroundings when placed in the wild. There have been many inventions of feeders that fall within this category, some typical examples being U.S. Pat. No. 5,143,289 to Gresham, Mar. 26, 1991, and U.S. Pat. No. 5,463,980 to Rassmussen, Oct. 26, 1994.

There have not been many feeder inventions that utilize only natural energy sources for power. One invention that I am aware of is U.S. Pat. No. 5,333,572 to Nutt, Aug. 2, 1993, which is thermostatically powered by temperature changes. Although this feeder is quiet and unobtrusive, it has two main disadvantages. One being the fact that it has complicated and expensive components. Another disadvantage is that it depends upon unpredictable weather conditions, which can allow it to distribute feed at night.

OBJECTS AND ADVANTAGES

Accordingly, several objects and advantages of my invention are:

(a) to provide a feeder which distributes feed during the daytime hours only;

(b) to provide a feeder that is simple, inexpensive, and low-maintenance;

(c) to provide a feeder that is quiet and unobtrusive to the natural surroundings;

(d) to provide a feeder that prevents undesirable animals from raiding the food supply;

(e) to provide a feeder that is totally powered by a free and reliable source of energy.

Further objects and advantages are to provide a feeder that includes a means for regulating the daily amount of feed distributed, and a simple and reliable mechanism for releasing the feed. Still further objects and advantages will become apparent from a consideration of the ensuing description and drawings.

SUMMARY OF THE INVENTION

The present invention is a squirrel-powered animal feeder that is suspended alongside a tree or other vertical structure, comprising a feed hopper that opens to the top side of an attached horizontal platform. The platform includes a mechanical device for knocking the grain off the platform to the ground below where it can be consumed by other animals. Hungry squirrels jump from the tree over to the platform in order to get to the visible feed. The resulting forces generated by the momentum of the jump activates the mechanical device.

Figure 1:
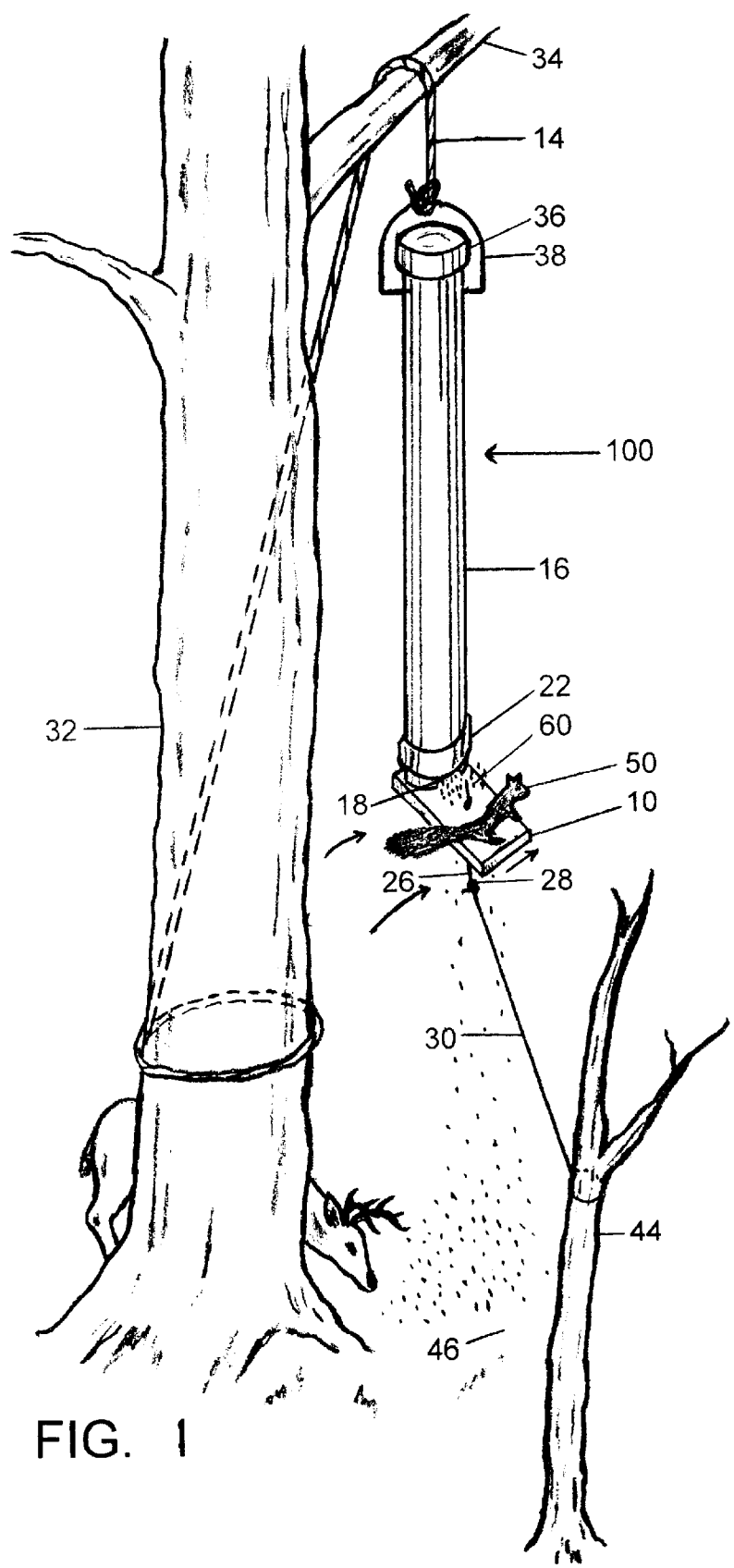
FIG. 1 is a perspective view of the preferred embodiment of my invention.

REFERENCE NUMERALS IN DRAWINGS 10 platform
12 hopper floor
14 supporting rope or cable
16 hopper
18 hole
22 cover plate
24 small hole
26 wire lever
28 loop
30 anchoring cord
32 tree trunk
34 tree limb
36 waterproof cap
38 bail
40 landing pad
42 finger
44 nearby tree or post
46 ground
48 guide bracket
50 squirrel
60 feed particles
100 general reference to feeder

DESCRIPTION—FIGS. 1 TO 4

Referring initially to FIG. 1 of the drawings, a preferred embodiment of my animal feeder has been generally designated by the reference numeral 100. Feeder 100 is suspended at a predetermined distance above the ground 46, and at a predetermined distance from the tree trunk 32, by a supporting rope or cable 14. Supporting rope 14 passes over a tree limb 34 and is tied securely to the tree trunk 32. Generally, feeder 100 includes a hopper 16, a platform 10, and an agitating device. In the embodiment illustrated, the agitating device is a wire lever 26. Feeder 100 also includes an anchoring cord 30, which ties off to a nearby tree or post 44, a waterproof cap 36, and a means 38 for attaching the supporting rope 14. In the embodiment illustrated, the hopper 16 is a predetermined length of thin-walled, plastic pipe, which houses the feed particles 60, and the means for attaching the support rope 14 is a bail 38. Also, the illustration of the embodiment shows a live squirrel 50 sitting on the platform 10.

Figure 2:
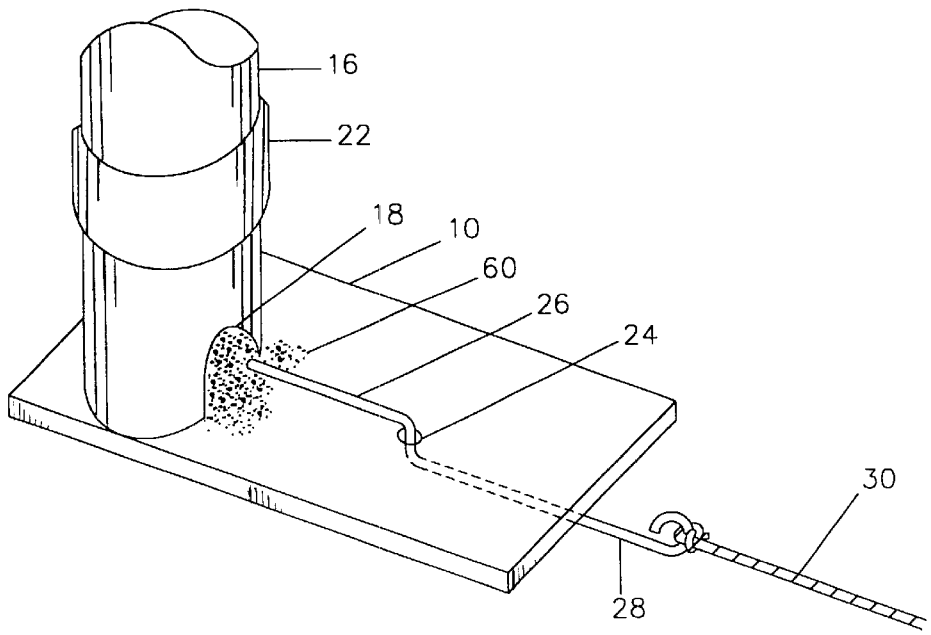
FIG. 2 is a perspective view of the platform, fitted with the preferred embodiment of the agitator, (the wire rod lever)

Referring now to FIG. 2, in a preferred embodiment illustrated, platform 10 is fitted with a stiff, wire lever 26, with one end of the lever being positioned directly in front of hole 18, and being in contact with feed particles 60. Lever 26 makes a downward, 90 degree turn about 4 inches from hole 18, and passes through the center of platform 10 via a small hole 24. Upon exiting the small hole 24 on the bottom side of platform 10, lever 26 makes another 90 degree turn in the opposite direction of the first turn. Lever 26 extends to the end of platform 10, and terminates into a small loop 28. An anchoring cord 30 is tied to loop 28.

Figure 3:
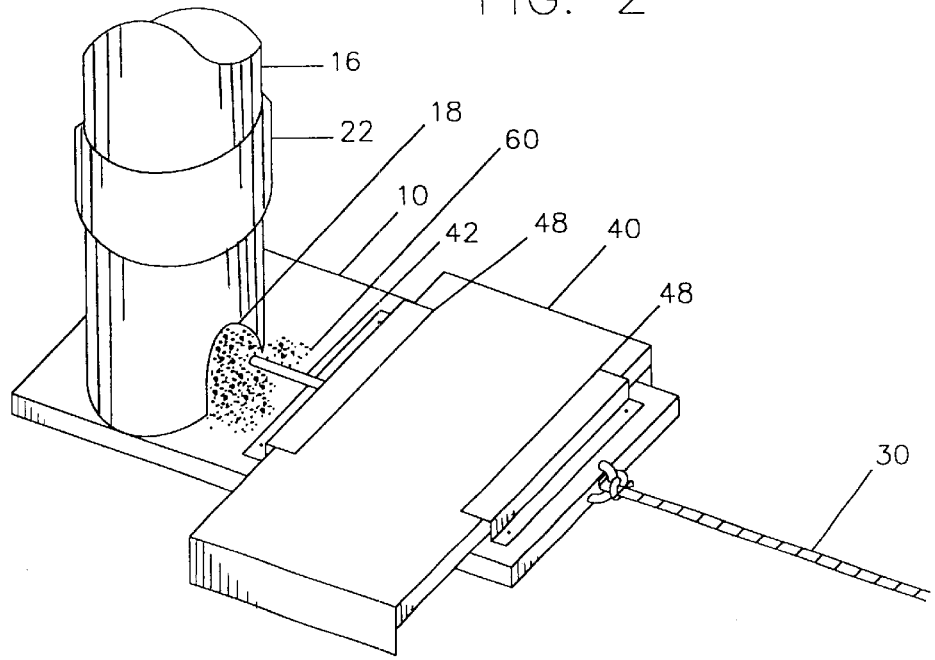
FIG. 3 is a perspective view of the platform, fitted with an alternate preferred embodiment of the agitator, (the landing pad)

Referring now to FIG. 3, in an alternate preferred embodiment, platform 10 is fitted with a laterally sliding landing pad 40. The pad includes a rigid finger 42, which extends to a point directly in front of hole 18, and being in contact with feed particles 60. Landing pad 40 is mounted to the flat, upper surface of platform 10, secured by two guide brackets 48, in a manner that allows it to slide horizontally back and forth across platform 10. Anchoring cord 30 is attached directly to the end of platform 10.

Figure 4:
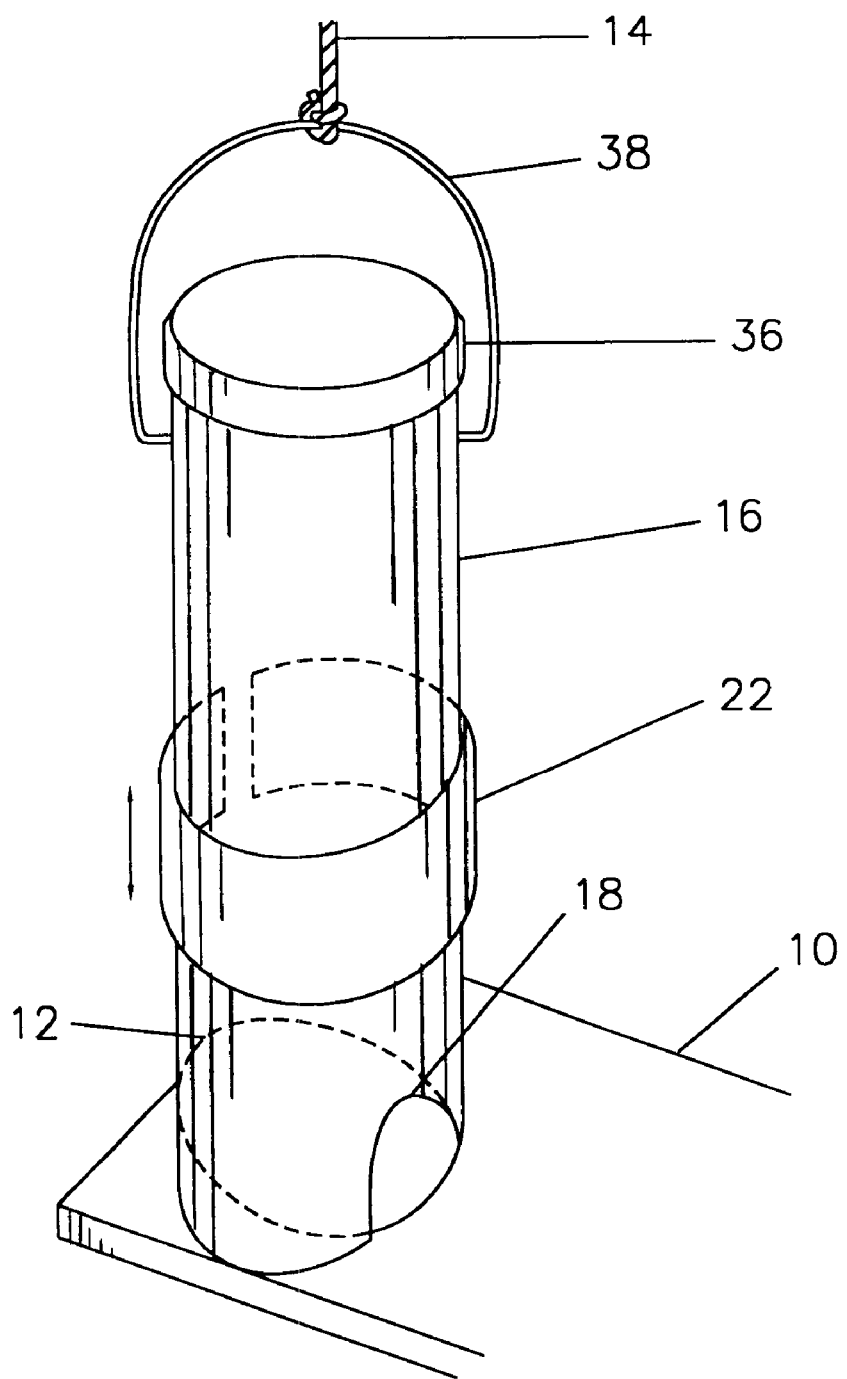
FIG. 4 is a perspective view of the hopper assembly.

Referring now to FIG. 4, the hopper floor 12 is flat on the bottom, being perpendicular to the vertical walls of the hopper 16 and is attached to the flat surface of the platform 10, being located at the edge of one end. The hopper 16 includes a hole 18 located on the bottom of the side, with the hole 18 positioned in the center of platform 10, and facing the opposite end of the platform. The upper side of the hopper floor 12 is beveled and sloping toward the hole 18. The upper end of hopper 16 includes a waterproof cap 36, and a means for attaching supporting rope 14. In the embodiment illustrated, the attaching means is a metal bail 38, attached to hopper 16 immediately below waterproof cap 36. A movable blocking means is positioned on the vertical wall of hopper 16. In the embodiment illustrated, the blocking means is a cover plate 22 that conforms to the shape of hopper 16, and can slide vertically to selected positions over hole 18.

OPERATION—FIGS. 1, 2, AND 4

The operation of this game feeder begins by passing support rope 14 over a high tree limb 34 at a point to allow the feeder 100 to hang at least two feet out from the tree trunk 32. This is sufficient distance to prevent climbing raccoons from reaching the feeder 100 after it is hoisted up. Attach one end of rope 14 securely to the bail 38 at the upper end of hopper 16.

Position platform 10 on the ground directly below the limb 34, and slide cover plate 22 down to completely close off hole 18 during the filling process. Elevate the upper end of hopper 16, remove waterproof cap 36, and pour in the feed particles 60. Replace waterproof cap 36.

Stand hopper 16 upright, and hoist the entire assembly with rope 14 until platform 10 is at a sufficient distance above ground level to prevent deer from reaching it. Tie the end of rope 14 securely to the base of the tree 32. The assembly should now be hanging freely about two feet away from the tree trunk 32, and about six feet above the ground 46.

Tie the end of anchoring cord 30 to the small loop 28 on the end of lever 26. Pull cord tight enough to hold platform 10 in a sideways position relative to the tree trunk 32, and tie the end of cord 30 to a nearby tree 44. Make sure the cord 30 is not too tight, thereby causing the feeder assembly to lean rather than hang straight down on the supporting rope 14.

Slide the cover plate 22 up to a selected position to allow feed particles to spill out of hole 18 onto the platform 10. The weight of the feed inside the hopper 16 causes the feed to jam at hole 18, and not continuously flow out unless agitated. The more hole 18 is opened, the more feed will be dispensed to the platform 10 before becoming jammed.

The feeder 100 is now set up and ready to work. Until disturbed, the feed is safely stored and is not accessible to any animals except squirrels and birds. When a hungry squirrel 50 sees the feed particles 60 on the platform 10, he will leap from the tree trunk 32 over to the platform in order to get to the feed. The kinetic force created by his weight and momentum upon landing on platform 10 pushes the platform laterally in the same direction. The cord 30 holds lever 26 in a fixed position, and as the platform 10 pivots sideways, feed particles 60 are swept off by the end of the lever near hole 18. When the squirrel 50 leaps back over to the tree, his legs will force platform 10 in the opposing direction, again causing the lever to sweep more feed off the platform to the ground below for consumption by deer and other wildlife.

After dark, squirrels are no longer active, so the feeder 100 hangs undisturbed until the next morning. Eventually other wildlife will begin to notice that food is consistently available all day long, and will therefore start visiting the sites during the daylight hours.

OPERATION—FIG. 3

FIG. 3 illustrates an alternative preferred embodiment of platform 10, where it is fitted with a laterally sliding landing pad 40, instead of the wire lever 26. In this embodiment, everything about the feeder assembly is the same except the means for agitating the feed.particles, and the cord 30 is attached directly to the end of platform 10. This embodiment works as follows:

When the squirrel 50 leaps over to platform 26 in order to get to the feed, the kinetic force created by his weight and momentum upon landing on the landing pad 40, pushes the pad laterally in the same direction. The cord 30 holds platform 10 in a fixed position, and as the landing pad 40 moves sideways, feed particles are swept off by the finger 42 near hole 18. When the squirrel 50 leaps back over to the tree, his legs will force landing pad 40 in the opposite direction, again causing the finger to sweep more feed off the platform.

CONCLUSION, RAMIFICATIONS, AND SCOPE

Accordingly, the reader will see that the animal feeder of this invention is a unique, simple, and inexpensive wildlife feeder that is totally powered by the energy of feeding squirrels. Furthermore, the feeder distributes feed to wildlife during the daylight hours only, making it useful to deer and hog hunters, wildlife photographers, bird watchers, park managers, biologists, or anyone else interested in observing wildlife. It is quiet, dependable, low maintenance, and is unobtrusive to the natural surroundings. In addition, it cannot be raided by undesirable animals. Although supplying food to squirrels is the key factor of this invention, feeding deer and other animals is the main purpose. If shelled corn is primarily used in this feeder, the squirrels will actually consume very little of it themselves. They love corn and are strongly attracted to it, but will only eat the small tip of each kernel. Deer, hogs, raccoons, turkeys, and many other animals will readily eat the rest.

Although the description above contains many specificities, these should not be construed as limiting the scope of the invention, but as merely providing illustrations of some of the presently preferred embodiments of this invention. For example, the feeder can have other types of storage containers such as buckets or barrels; the feeders may be used over water to feed fish and ducks; or used around farms to feed chickens; they are adaptable for use by chipmunks and ground-squirrels in areas that do not have tall trees. Also, they can be adapted to activate other apparatuses, such as watering devices.

Thus the scope of the invention should be determined by the appended claims and their legal equivalents, rather than by the examples given.

What I claim is:

1. A squirrel-powered animal feeder, adapted to hang alongside a vertical structure, comprising:
    (a) an elongated tubular hopper of sufficient length to serve as a feed container; said hopper having a top, bottom and vertical sides, including a hole in the side at the bottom of said hopper; said hole being of sufficient size to allow feed particles to flow from said hopper; said hopper further including a floor, with the underside of said floor being flat and perpendicular to the vertical sides of said hopper;
    (b) a flat, rectangular shaped platform, the upper surface of said platform being attached to the flat underside of said hopper floor; said hopper being located at one end of said platform, with bottom of said hole being on the same horizontal plane with upper surface of said platform; said hole being centered and facing the platform end opposite the hopper location; whereby the extended portion of said platform being of sufficient size to allow a live squirrel to jump onto said platform from said vertical structure;
    (c) agitating means for the purpose of causing said feed particles to fall off said platform to the ground below; said agitating means adapted in front of said hole in said hopper, and adapted to move as a direct result of energy released when said squirrel jumps onto or off of said platform.

2. The feeder of claim 1, wherein the upper side of said hopper floor is wedge shaped; said upper side sloping toward said hole; said sloping floor acting to hold said feed particles within said hopper at a higher level than said platform, thereby providing means to prevent rain water from flowing laterally into said hole and soaking said feed particles; said sloping floor further acting to direct the gravitational flow of said feed particles in a lateral direction toward said hole.

3. The feeder of claim 2, wherein said hopper further includes blocking means for selectively regulating the size of said hole, thereby determining the quantity of feed particles allowed to flow out of said hole.

4. The feeder of claim 3, wherein said blocking means comprises a cover plate, conforming in shape to the vertical wall of said hopper immediately surrounding said hole, and slidably mounted to said vertical wall to allow selective positioning of said cover plate over said hole.

5. The feeder of claim 2, wherein said hopper is a predetermined length of lightweight, thin-wall pipe; said pipe including a removable waterproof cap at the top; said pipe further including means for attaching a supporting rope or cable.

6. The feeder of claim 2, wherein said agitator means is a stiff wire lever; one end of said lever being positioned on top of said platform, directly in front of said hole; said lever containing a 90 degree bend approximately 4 inches from the end facing said hole; said lever passing down through a small hole in the center of said platform at said bend; said lever containing an opposite 90 degree bend at the point where said lever exits said hole on the bottom side of said platform; lower end of said lever extending to the end of said platform, and shaped into a small loop; whereby said wire lever provides a pivoting lever for the purpose of moving laterally to sweep food particles off said platform.

7. The feeder of claim 6, wherein a cord is attached to said small loop on the end of said lever; the opposite end of said cord being anchored tightly to a nearby tree; whereby, when said feeder is suspended alongside said vertical structure, said cord acts to hold said platform in a sideways position relative to said vertical structure.

8. The feeder of claim 7, wherein said feeder is suspended at a sufficient height to prevent animals on the ground from accessing it; said feeder further being suspended at a distance from said vertical structure sufficient to prevent climbing raccoons from accessing it, yet close enough to allow squirrels to jump over to it; whereby, when a squirrel jumps from said vertical structure over to said platform, the kinetic force created by its weight and momentum upon landing pushes the platform laterally; said cord holding said lever in place, causes said feed particles to be swept off said platform to animals on the ground; when said squirrel jumps back off said platform, said platform is shoved again, causing more feed to be swept off said platform.

9. The feeder of claim 2, wherein said agitator means is a landing pad, slidably adapted to the upper surface of said platform; said landing pad including a finger extending to a point immediately in front of said hole in said hopper, whereby said finger provides a rake for the purpose of moving laterally to sweep food particles off said platform.

10. The feeder of claim 9, wherein a cord is attached to the platform end opposite of the hopper location; the opposite end of said cord being anchored tightly to a nearby tree; whereby, when said feeder is suspended alongside said vertical structure, said cord acts to hold said platform in a sideways position relative to said vertical structure.

11. The feeder of claim 10, wherein said feeder is suspended at a sufficient height to prevent animals on the ground from accessing it; said feeder further being suspended at a distance from said vertical structure sufficient to prevent climbing raccoons from accessing it, yet close enough to allow squirrels to jump over to it; whereby, when a squirrel jumps from said vertical structure over to said platform, the kinetic force created by its weight and momentum upon landing on said landing pad, pushes said landing pad laterally; said cord holding said platform in place, causes said feed particles to be swept off said platform to animals on the ground; when said squirrel jumps back off said platform, said landing pad is shoved again, causing more feed to be swept off said platform.

12. A method of utilizing the natural energy produced by live squirrels to transfer granular feed particles from a suspended container to the surface below, whereas said feed can be eaten by animals not otherwise able to access said feed, said method comprising the steps of:

a) providing a feed hopper with a hole located at the base of said hopper, wherein said hole is adjacent a platform of sufficient size to allow a squirrel to jump from an adjacent vertical structure onto said platform;

b) having an agitating means adapted to be in front of said hole, said agitating means adapted to move as a direct result of the momentum caused by the jumping of said squirrel onto said platform;

c) whereby the movement of said agitating means knocks sufficient quantities of feed particles off said platform to the ground below, said feed particles providing an attractant to other animals in the area.

\* \* \* \* \*